US008511562B2

(12) United States Patent
Onoda et al.

(10) Patent No.: US 8,511,562 B2
(45) Date of Patent: Aug. 20, 2013

(54) LAYERED TWO-DIMENSIONAL CODE, CREATION METHOD THEREOF, AND READ METHOD

(75) Inventors: Tatsuya Onoda, Mie (JP); Kazuhiro Miwa, Mie (JP)

(73) Assignee: Content Idea of Asia Co., Ltd., Mie (JP)

( * ) Notice: Subject to any disclaimer, the term of this patent is extended or adjusted under 35 U.S.C. 154(b) by 1214 days.

(21) Appl. No.: 11/988,885

(22) PCT Filed: Apr. 4, 2006

(86) PCT No.: PCT/JP2006/307091
§ 371 (c)(1),
(2), (4) Date: Jan. 15, 2008

(87) PCT Pub. No.: WO2007/010650
PCT Pub. Date: Jan. 25, 2007

(65) Prior Publication Data
US 2009/0166418 A1 Jul. 2, 2009

(30) Foreign Application Priority Data
Jul. 22, 2005 (JP) ................. 2005-213336

(51) Int. Cl.
G06K 7/12 (2006.01)
G06K 7/00 (2006.01)
G06K 19/08 (2006.01)
(52) U.S. Cl.
USPC ...................... 235/469; 235/462.04
(58) Field of Classification Search
USPC ............................. 235/469, 462.04
See application file for complete search history.

(56) References Cited

U.S. PATENT DOCUMENTS

| 5,355,001 A | 10/1994 | Fujimoto | |
|---|---|---|---|
| 5,369,261 A | 11/1994 | Shamir | |
| 5,568,555 A | 10/1996 | Shamir | |
| 5,576,528 A | 11/1996 | Chew | |
| 5,896,403 A | 4/1999 | Nagasaki | |
| 2004/0125983 A1* | 7/2004 | Reed et al. | 382/100 |
| 2004/0182930 A1* | 9/2004 | Nojiri | 235/462.04 |
| 2006/0039016 A1* | 2/2006 | Harrison, Jr. | 358/1.9 |

FOREIGN PATENT DOCUMENTS

| CA | 2074728 A1 | 5/1992 |
|---|---|---|
| EP | 0 513 375 A1 | 6/1992 |
| EP | 0 670 555 A1 | 6/1995 |

(Continued)

Primary Examiner — Thien M Le
Assistant Examiner — Toan Ly
(74) Attorney, Agent, or Firm — Hedman & Costigan, P.C.; James V. Costigan; Kathleen A. Costigan

(57) ABSTRACT

The present invention provides a layered two-dimensional code which can be considerably improved in the data capacity thereof without increasing the area thereof by integrating a plurality of two-dimensional codes by a predetermined correlation and expressing it as one two-dimensional code, a method of creating the layered two-dimensional code, and a method of reading the layered two-dimensional code. The layered two-dimensional code is formed as a surface layer by layering a plurality of code layers (for example, code layers 1, 2, and 3) each having information cells ($1a'$, $1a''$, and the like) arranged in a two-dimensional matrix and by integrating the plurality of code layers. An index information code $1c$ essentially including the information of an RGB value of each code layer is included at one part of the surface layer. When the information cells ($1a'$ and $1a''$) of the code layers 1 and 2 are superposed.

8 Claims, 10 Drawing Sheets

(56) References Cited

FOREIGN PATENT DOCUMENTS

| JP | 06-231466 A | 8/1994 |
|---|---|---|
| JP | 2938338 | 6/1999 |
| JP | 11-353436 | 12/1999 |
| JP | 2001-319200 | 11/2001 |
| JP | 2003-178277 | 6/2003 |
| JP | 2004-234318 | 8/2004 |
| JP | 2004-326582 | 11/2004 |
| WO | WO92/09972 A1 | 6/1992 |
| WO | WO94/83314 | 4/1994 |

* cited by examiner

Fig. 1
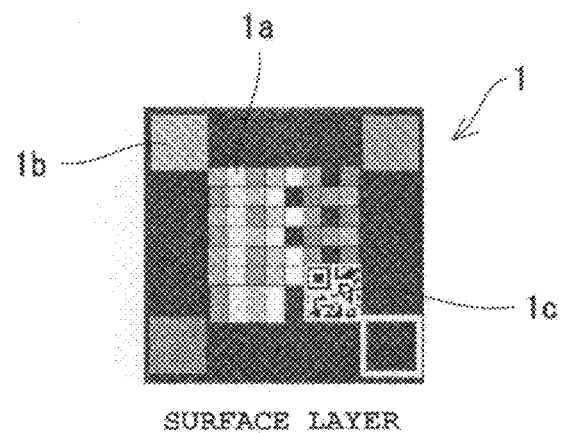
SURFACE LAYER
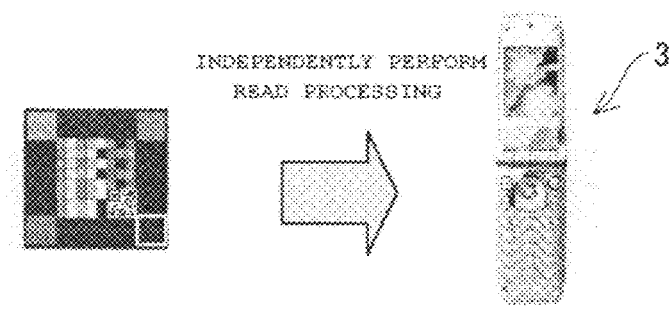
INDEPENDENTLY PERFORM
READ PROCESSING

US 8,511,562 B2

LAYERED TWO-DIMENSIONAL CODE, CREATION METHOD THEREOF, AND READ METHOD

TECHNICAL FIELD

The present invention relates to a layered two-dimensional code in which cells are disposed in a matrix configuration and particularly to a layered two-dimensional code, unconnected to the Net, which includes layered information within the code, and a layered two-dimensional code, connected to the Net, which obtains layered information from a server.

BACKGROUND ART

A bar code is in wide use because it can be read quickly and correctly. Bar codes indicating the information of commodity management, production management, and the like are attached to various articles. The bar code is classified into a one-dimensional bar code having information arranged in one direction and a two-dimensional bar code having information arranged in longitudinal and widthwise directions so that two-dimensional bar code has a larger amount of information than the one-dimensional bar code. The one-dimensional bar code has been mainly attached to commercially distributed commodities and the like having a small amount of necessary information. On the other hand, the two-dimensional code has an advantage of allowing a large amount of information to be accommodated in a small space, and in addition, owing to recent progress of portable telephones and the like, individuals can read and recognize the two-dimensional code easily. Therefore the two-dimensional code has spread rapidly and is utilized by attaching it to information magazines and pamphlets or displaying it on screens. As information to be stored, text information, Internet address information, and the like are listed.

As the two-dimensional code, Code49 (Intermec Technologies Corporation (United States of America)), PDF417 (Symbol Technologies Inc. (United States of America)), Vericode (VERITEC Inc. (United States of America)), DataMatrix (I.D.MATRIX Inc. (United States of America)), QR code (Denso Corporation (Japan)), and the like have been developed and introduced. Of the above-described two-dimensional codes, the Code49, the PDE417, and the like have conventional bar codes stacked one upon another and are called a stack-type two-dimensional code. On the other hand, the QR code, the VeriCode, the DataMatrix, and the like have the form of checkers and are called a matrix-type two-dimensional code. Of these two-dimensional codes, the QR (Quick Response) code developed and introduced by Denso Corporation has been spread and utilized most widely in Japan (see patent document 1).

The minimum unit (black and white square) constituting the QR code is called a cell. The QR code is indicated by the combination of cells and constructed of a position detection pattern (positioning symbol), format information having information such as a timing pattern, an error correction level, and a mask number, data, and an error correction code (Reed-Solomon Code). To indicate the same amount of information, the QR code uses 1/30 of a space used by existing bar codes. Further owing to three positioning symbols, the QR code can be read at any angles in 360 degrees. The positioning symbols means three (one in micro QR) position detection patterns disposed at three corners of the QR code. By retrieving this pattern, it is possible to recognize the position of the QR code, which enables a high-speed read. When 30% of the area of a data region becomes dirty or is lost, the data of the QR code can be restored and identified. Data for restoring the data which has become dirty or has been lost has the effect of preventing erroneous read and preventing erroneous data from being outputted.

The two-dimensional code such as the QR code has more information amount than the one-dimensional bar code. But in a code size which can be recognized by a camera of a portable telephone or the like, the information capacity of the two-dimensional code is as small as the address information of the Internet and is incapable of storing information of a large capacity such as a long sentence of a text and an image. To cope with such a problem and increase the capacity of the two-dimensional code, for example, as a display color of two-dimensional code data, a color two-dimensional code using "white", "black", "red", "green", and "blue" is disclosed (see patent document 2).

But the color two-dimensional code disclosed in the patent document 2 has a problem that there is a limitation in the data capacity because it has a small number of colors. Further because the colors of cells are judged from the surface of the two-dimensional code to obtain the data of the colors of cells, the data value of each cell merely increases according to an increase of the number of colors. Thus it is impossible to expect a large increase in the data capacity.

Patent document 1: Pat. No. 2,938,338
Patent document 2: Japanese Patent Application Laid-Open No. 2004-234318

DISCLOSURE OF THE INVENTION

Problem to be Solved by the Invention

The present invention has been made in view of the above-described problems. It is an object of the present invention to provide a layered two-dimensional code which can be considerably improved in the data capacity thereof without increasing the area thereof by integrating a plurality of two-dimensional codes by a predetermined correlation and expressing it as one two-dimensional code, a method of creating the layered two-dimensional code, and a method of reading the layered two-dimensional code.

Means for Solving the Problem

A layered two-dimensional code of claim 1 is formed as a surface layer by layering a plurality of code layers each having information cells arranged in a two-dimensional matrix and by integrating the plurality of code layers. Each of the plurality of code layers is constructed of information cells each having a color specified for each of the code layers; the surface layer comprises a surface-layer information cell obtained by layering the code layers one upon another; and an index information code essentially including information of a predetermined color of each of the code layers is included at one part of the surface layer.

When the information cells of the plurality of code layers are present and superposed one upon another at a position thereof corresponding to the surface-layer information cell, a color of the surface-layer information cell is obtained by executing an additive color mixture of colors of the code layers where the superposed information cells are present. When the information cell of only one of the code layers is present at the position thereof corresponding to the surface-layer information cell, the surface-layer information cell has the same color as that of the single code layer. When the color obtained by executing the additive color mixture is the same as that of any of the plurality of code layers, the color obtained by executing the additive color mixture is converted into a color in accordance with a predetermined conversion algorithm so as to obtain the color of the surface-layer information cells (hereinafter referred to as a layered two-dimensional code unconnected to the Net).

In the conversion algorithm, after an RGB value indicating a color obtained by the additive color mixture is converted into an HSB value, the HSB value is further converted into an RGB value.

A method of claim 3 of creating a layered two-dimensional code comprises the steps of deciding the number of the code layers and a color of each of the code layers; deciding an arrangement of the information cells of each of the code layers by distributing information to be coded to each of the code layers; layering the code layers one upon another in a predetermined order to form the surface layer; and forming an index information code essentially including color information of each of the code layers at a part of the surface layer.

In the above-described layering step, the code layers are layered one upon another to decide an arrangement of the surface-layer information cells constructing the surface layer. When the information cells of the plurality of code layers are present and superposed one upon another at a position thereof corresponding to the surface-layer information cell, a color of the surface-layer information cells is obtained by executing an additive color mixture of colors of the code layers where the superposed information cells are present. When the information cell of only one of the code layers is present at the position thereof corresponding to the surface-layer information cell, the surface-layer information cell has the same color as that of the single code layer. When the color obtained by executing the additive color mixture is the same as that of any of the plurality of code layers, the color obtained by executing the additive color mixture is converted into a color in accordance with a predetermined conversion algorithm so as to obtain the color of the surface-layer information cells.

In the present invention, to decide the color means to decide the RGB value indicating the color.

A method of claim 4 of reading a layered two-dimensional code comprises the steps of recognizing a code of the surface layer by using a read means having essentially a code-recognizing apparatus capable of recognizing a color gradation constructing the layered two-dimensional code; obtaining an RGB value indicating a color of each of the code layers by reading the index information code; obtaining an RGB value indicating a color of each of the surface-layer information cells; dividing the surface layer into the code layers; and restoring coded original information by integrating information obtained from the arranged information cells of each of the code layers obtained by the dividing operation.

In the above-described layering step, when the RGB value indicating the color of each of the surface-layer information cells indicates the same color as that of any of the plurality of code layers, it is judged that the information cells of only the code layers are present at a position thereof corresponding to the surface-layer information cells. When the RGB value indicating the color of the surface-layer information cells does not indicate the same color as that of any of the plurality of code layers, by executing an additive color mixture, a plurality of code layers having the RGB value indicating the color of the surface-layer information cells is found, and it is judged that the information cells of the plurality of code layers are present at the position thereof corresponding to the surface-layer information cells. When the RGB value indicating the color of the surface-layer information cells indicates a color obtained by conversion executed in accordance with a predetermined conversion algorithm, a plurality of code layers having the RGB value indicating the color of the surface-layer information cells is found by a reverse conversion of the conversion algorithm, and by judging that the information cells of the plurality of code layers are present at the position thereof corresponding to the surface-layer information cells, the surface layer is divided into the code layers.

A layered two-dimensional code of claim 5 is formed as a surface layer by layering a plurality of code layers each having information cells arranged in a two-dimensional matrix and integrating the plurality of code layers. Each of the plurality of code layers is constructed of information cells each having a color specified for each of the code layers. The surface layer comprises surface-layer information cells obtained by layering the code layers one upon another. At a part of the surface layer or inside a read means of the layered two-dimensional code, there is included a code for server connection information by which the read means obtains information of a predetermined color of each of the code layers and information of each of the code layers constructing the surface-layer information cells from a predetermined server connected through an electrical communication circuit.

When the information cells of the plurality of code layers are present and superposed one upon another at a position thereof corresponding to the surface-layer information cell, a color of the surface-layer information cell is obtained by executing an additive color mixture of colors of the code layers where the superposed information cells are present; and when the information cell of only one of the code layers is present at the position corresponding to the surface-layer information cell, the surface-layer information cell has the same color as that of the single code layer (hereinafter referred to as a layered two-dimensional code connected to the Net).

"Information of each of the code layers constructing the surface-layer information cells" in the above means which of the code layers constructs each surface-layer information cell.

A method of claim 6 of creating a layered two-dimensional code according to claim 5 comprises the steps of deciding the number of the code layers and a color of each of the code layers; deciding an arrangement of the information cells of each of the code layers by distributing information to be coded to each of the code layers; layering the code layers one upon another in a predetermined order to form the surface layer; and registering the number of the code layers, the color of each of the code layers, and information of the code layers constructing the surface-layer information cells in the predetermined server connected through the electrical communication circuit.

In the above-described layering step, the code layers are layered one upon another to decide an arrangement of the surface-layer information cells constructing the surface layer. When the information cells of the plurality of code layers are present and superposed one upon another at a position thereof corresponding to the surface-layer information cell, a color of the surface-layer information cells is obtained by executing an additive color mixture of colors of the code layers where the superposed information cell is present. When the information cell of only one of the code layers is present at the position thereof corresponding to the surface-layer information cell, the surface-layer information cell has the same color as that of the single code layer.

A method of claim 7 of reading a layered two-dimensional code according to claim 5 comprises the steps of recognizing a code of the surface layer by using a read means having essentially a code-recognizing apparatus capable of recognizing a color gradation constructing the layered two-dimensional code; obtaining the number of the code layers, an RGB value indicating a color of each of the code layers, and the information of each of the code layers constructing the surface-layer information cells by accessing the server connected through the electrical communication circuit; obtaining an RGB value indicating a color of each of the surface-layer information cells; dividing the surface layer into the code layers; and restoring coded original information by integrating information obtained from the arranged information cells of each of the code layers obtained by the dividing operation.

In the above-described dividing step, when the RGB value indicating the color of each of the surface-layer information cells indicates the same color as that of any of the plurality of code layers, based on information of the code layers constructing the surface-layer information cells obtained from the predetermined server, a plurality of code layers where the information cells are present at a position thereof corresponding to the surface-layer information cell are found. When the RGB value indicating the color of each of the surface-layer information cells does not indicate the same color as that of any of the plurality of code layers, by executing an additive color mixture, a plurality of code layers having the RGB value indicating the color of each of the surface-layer information cells is found, and by judging that the information cells of the plurality of code layers is present at the position thereof corresponding to the surface-layer information cells, the surface layer is divided into the code layers.

At a part of the surface layer, a predetermined reference color cell is included.

Effect of the Invention

Because the layered two-dimensional code unconnected to the Net of claim 1 is obtained by layering code layers each having the predetermined color one upon anther, it is possible to considerably increase the data capacity without increasing the area thereof. For example, when the number of the code layers is eight, the data capacity of the layered two-dimensional code of claim 1 is eight times larger than that of the conventional two-dimensional code having the same size as that of the layered two-dimensional code of claim 1. Because information can be simply coded to each code layer by utilizing an existing method of creating a two-dimensional code, it is unnecessary to use a separate algorithm.

Because the index information code essentially including the information of the predetermined color of each of the code layers is included at one part of the surface layer, it is possible to decode data by using only a read means such as a read application (software) operating in a portable telephone with reference to the index information code. The data can be decoded easily and quickly because only a numerical computation simpler than that performed in a normal two-dimensional code is added.

Further the layered two-dimensional code of the present invention having the same area as that of the conventional two-dimensional code is capable of including data amount several times larger than the conventional two-dimensional code. Therefore the layered two-dimensional code of the present invention can be utilized as a part of the technique of compressing the data amount.

The color of the surface-layer information cell of the surface layer to be read is obtained by executing the additive color mixture of the colors of the code layers where the information cells are present at the position corresponding to the surface-layer information cell. Therefore by recognizing the arrangement and colors of the surface-layer information cells, it is possible to decide the arrangement of the information cells of the code layers each having the predetermined color thereof.

In the additive color mixture, it is supposed that the surface-layer information cell of the surface layer has the same color as that of any of the plurality of code layers. In this case, by using the color obtained by executing the predetermined conversion algorithm, it is possible to prevent this. When the surface-layer information cell of the surface layer has the same color as that of any of the plurality of code layers, it is impossible to distinguish whether the information cells are present in only one code layer or in a plurality of code layers at the position corresponding to the surface-layer information cell. In the present invention, this problem can be solved by the above-described construction.

In the predetermined conversion algorithm, after the RGB value obtained by the additive color mixture (R: red, G: green, and B: blue) is converted into the RGB value again through the HSB value (H: hue, S: saturation, B: brightness). Therefore by performing a simple computation utilizing an existing algorithm, it is possible to prevent the surface-layer information cell of the surface layer from having the same color as that of any of the code layers. Further by performing a reverse conversion, it is possible to easily find the original RGB value of the code layer.

The method of creating the layered two-dimensional code unconnected to the Net of claim 3 is capable of creating the layered two-dimensional code having a considerably increased data capacity.

In the method of reading the layered two-dimensional code unconnected to the Net of claim 4, the read means such as a read application (software) operating in a portable telephone is capable of independently reading the layered two-dimensional code having a considerably increased data capacity.

Because the layered two-dimensional code connected to the Net of claim 5 is obtained by layering the code layers each having the predetermined color one upon another, the layered two-dimensional code is capable of having a considerably increased data capacity. For example, supposing that the number of the code layers is 256, the data capacity of the layered two-dimensional code connected to the Net is 256 times larger than that of the conventional two-dimensional code having the same size as that of the layered two-dimensional code connected to the Net of the present invention. Because the colors of the code layers and the information of the code layers constructing the surface-layer information cells are obtained from the outside predetermined server, the layered two-dimensional code connected to the Net can be provided with more code layers than the layered two-dimensional code unconnected to the Net.

The color of the surface-layer information cell of the surface layer to be read is obtained by executing the additive color mixture of the colors of the code layers where the information cells are present at the position corresponding to the surface-layer information cell. Therefore by recognizing the arrangement and colors of the surface-layer information cells, it is possible to decide the arrangement of the information cells of the code layers each having the predetermined color thereof. Because the layered two-dimensional code connected to the Net allows the number of layers to be large, a small number of colors of the surface layers is indicated by the additive color mixture, and the code-recognizing ratio can be improved.

In the additive color mixture, it is supposed that the surface-layer information cell of the surface layer has the same color as that of any of the plurality of code layers. In the layered two-dimensional code connected to the Net, it is possible to obtain the information indicating which of the code layers constructs the surface-layer information cell from the predetermined server. Therefore the code layers can be easily divided.

The method of creating the layered two-dimensional code connected to the Net according to claim 6 is capable of creating the layered two-dimensional code connected to the Net having a still larger data capacity than the layered two-dimensional code unconnected to the Net. Further by registering the information of the code layers constructing the surface-layer information cells respectively in the predetermined server, it is unnecessary to make a color conversion when the color of the surface-layer information cell has the same color as that of any of the code layers.

In the method of reading the layered two-dimensional code connected to the Net of claim 7, the read means such as the read application (software) operating in the portable telephone is capable of reading the layered two-dimensional code, connected to the Net, which has a considerably increased data capacity without performing computations such as a reverse conversion.

At a part of the surface layer, the predetermined reference color cell is included. Therefore by compensating a color recognized by a code-recognizing apparatus by setting the color of the reference color cell as the reference color, it is possible to improve the code arrangement and the color recognition percentage.

BRIEF DESCRIPTION OF THE DRAWINGS

FIG. 1 is an outline view of a layered two-dimensional code unconnected to the Net.

EXPLANATION OF REFERENCE NUMERALS AND SYMBOLS

1: layered two-dimensional code unconnected to the Net
2: layered two-dimensional code connected to the Net
3: read means
4: server
5: electrical communication circuit
6: code creator

BEST MODE FOR CARRYING OUT THE INVENTION

Figure 2:
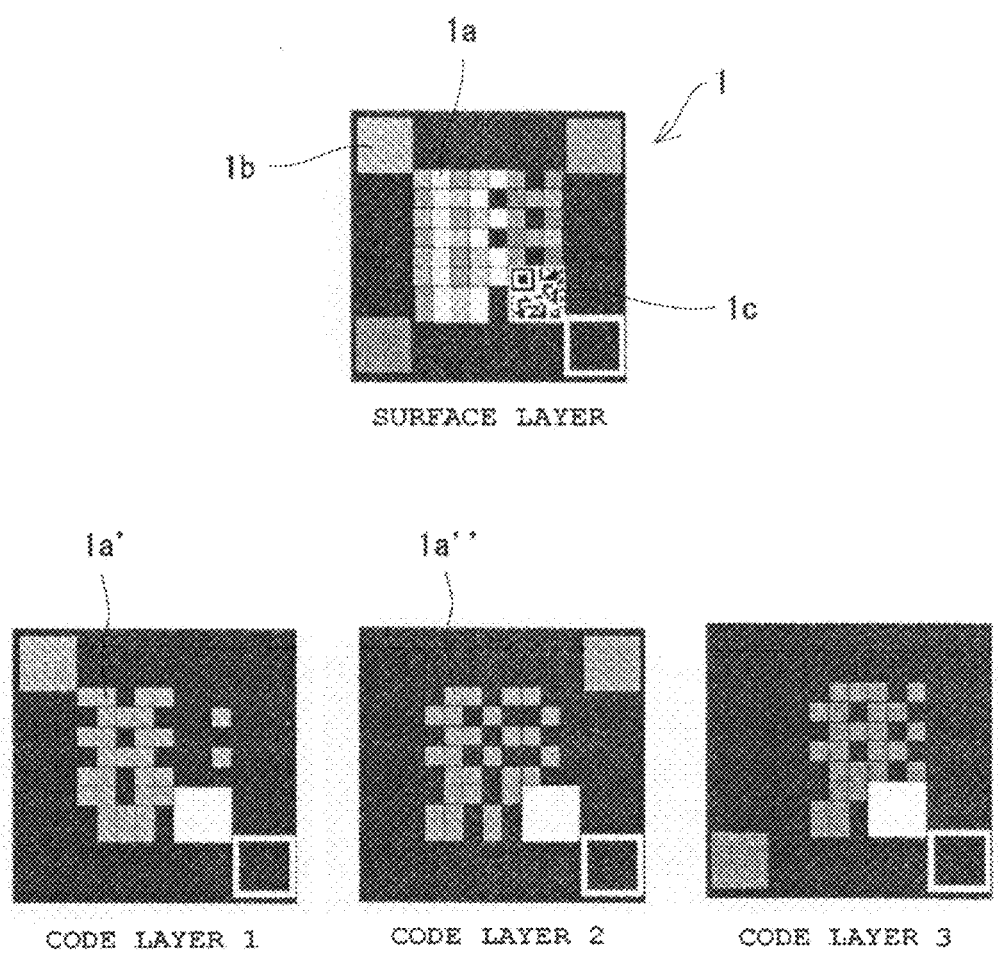
FIG. 2 shows the relationship between a surface layer and code layers of the layered two-dimensional code unconnected to the Net.

The outline of a layered two-dimensional code unconnected to the Net of the present invention is described below with reference to FIGS. 1 and 2. FIG. 1 is an outline view of the layered two-dimensional code unconnected to the Net. FIG. 2 shows the relationship between a surface layer and a code layer of the layered two-dimensional code unconnected to the Net.

A layered two-dimensional code 1 unconnected to the Net of the present invention is formed as a surface layer by layering a plurality of code layers (in FIG. 2, code layers 1, 2, and 3) each having information cells $1a'$ ($1a''$) arranged in a two-dimensional matrix and by integrating the plurality of code layers.

Each of the plurality of code layers is constructed of information cells each having a color specified for each code layer. For example, the code layers 1, 2, and 3 are constructed of information cells of (RGB=0, 255, 0), (RGB=255, 0, 0), and (RGB=0, 0, 255) respectively.

The surface layer is composed of a surface-layer information cell $1a$ obtained by layering the code layers one upon another (see FIG. 2). An index information code $1c$ essentially including the information of an RGB value of each code layer is included at one part of the surface layer.

As shown in FIG. 2, when the information cells ($1a'$ and $1a''$) of the code layers 1 and 2 are superposed one upon the other at a position thereof corresponding to the surface-layer information cell $1a$, the color of the surface-layer information cell $1a$ is obtained by executing an additive color mixture of the color of the code layer 1 and that of the code layer 2. More specifically, because the code layer 1 is green (RGB=0, 255, 0) and the code layer 2 is red (RGB=255, 0, 0), the color of the surface-layer information cell $1a$ is yellow (RGB=255, 255, 0). When the information cell of only one of the code layers is present at the position thereof corresponding to the surface-layer information cell $1a$, there are no superposed information cells. Thus the surface-layer information cell $1a$ has the same color as that of the single code layer.

As shown in FIG. 1, a predetermined reference color cell $1b$ is provided at four corners of the layered two-dimensional code 1. A code creator can arbitrarily decide the color of the reference color cell $1b$. For example, the color of the reference color cell $1b$ is set to blue (RGB=0, 0, 255), green (RGB=0, 255, 0), red (RGB=255, 0, 0), and black (RGB=0, 0, 0) clockwise from a lower left corner of the layered two-dimensional code 1. The information of the gradation and the like of each reference color can be included in the layered two-dimensional code 1 as necessary.

As described above, when the color of the surface-layer information cell of the surface layer is the same as that of any of code layers, there arises a problem that it is impossible to distinguish whether the information cell is present in only one code layer or in a plurality of code layers at the position corresponding to the surface-layer information cell. To cope with this problem, when the color obtained by executing the additive color mixture is the same as that of any of the plurality of code layers, the color obtained by executing the additive color mixture is converted into a color in accordance with a predetermined conversion algorithm.

Figure 3:
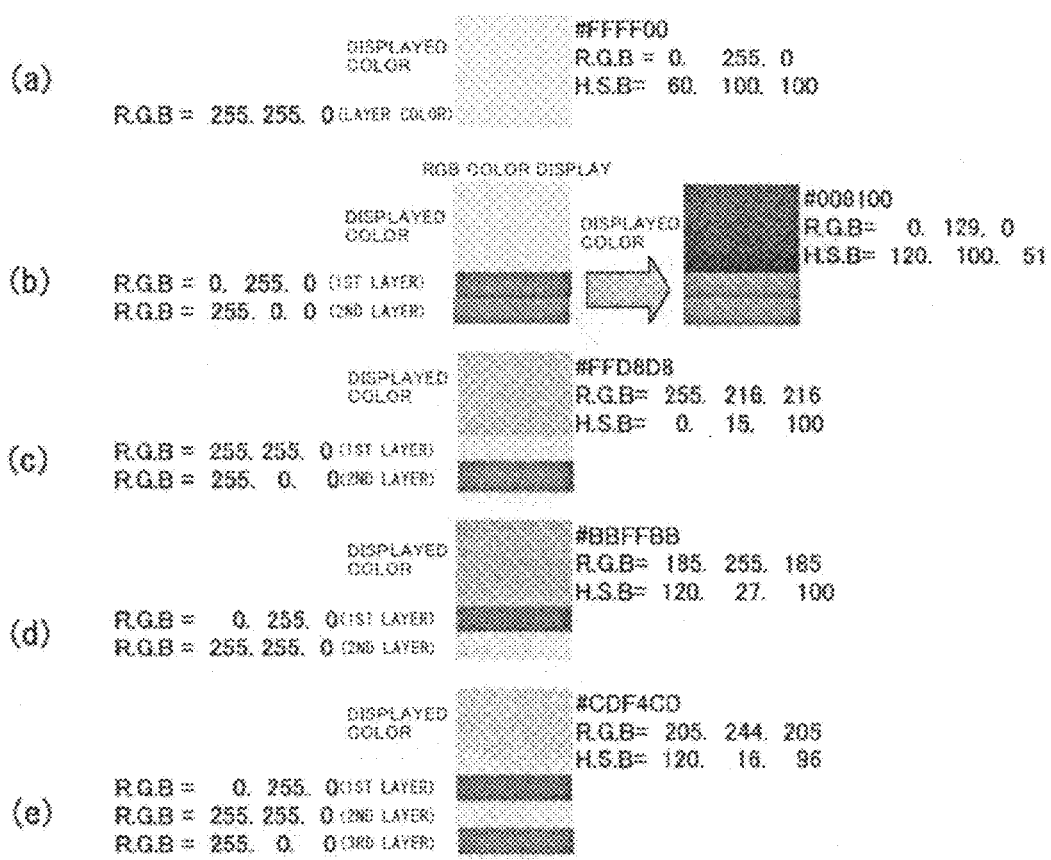
FIG. 3 shows a color conversion method of a surface-layer information cell to be carried out by using an additive color mixture and a conversion algorithm.

With reference to FIG. 3, a method of converting the color of the surface-layer information cell which is carried out by using the conversion algorithm is described below. In FIG. 3, a displayed color and a layer mean the color of the surface-layer information cell and the code layer respectively. In all of FIGS. 3(a) through 3(e), the color obtained by executing the additive color mixture is expressed in only yellow in print or display. This is because an expressible maximum value of each of the RGB is fixed (maximum: 255). But paying attention to the code layer, in FIG. 3(a), only the code layer of yellow (RGB=255, 255, 0) is present, whereas in FIG. 3(b), the code layer of green and that of red (additive color mixture: RGB=255, 255, 0) are layered on each other; in FIG. 3(c), the code layer of yellow and that of red (additive color mixture: RGB=510, 255, 0) are layered on each other; in FIG. 3(d), the code layer of green and that of yellow (additive color mixture: RGB=255, 510, 0) are layered on each other; and in FIG. 3(e), the code layer of green, that of yellow, and that of red (additive color mixture: RGB=510, 510, 0) are layered on each other. When a color obtained by executing the additive color mixture is printed or displayed, the cases of 3(a) through 3(e) cannot be distinguished from one another. Thus the color (RGB value) obtained by executing the additive color mixture is converted into other color (RGB value) in accordance with the predetermined conversion algorithm.

As the predetermined conversion algorithm, it is possible to use a desired algorithm capable of reversely converting the converted RGB value into the original RGB value of each code layer. As such an algorithm, it is possible to cite a method which is an existing color conversion method of making an interconversion between the RGB value and an HSB value.

In FIG. 3, the RGB value of each code layer is converted into the HSB value by executing the additive color mixture, and the HSB value is further converted by the predetermined conversion algorithm and then converted into the RGB value to obtain the color of the surface-layer information cell. For example, in the case of 3(b), because the code layer consists of a first layer (RGB=0, 255, 0) and a second layer (RGB=255, 0, 0), (the additive color mixture: RGB=255, 255, 0). When this is converted by the predetermined conversion algorithm, it is converted into the HSB value, HSB=120, 100, 51. When the HSB value is further converted into the RGB value, RGB=0, 129, 0. This is the color of the surface-layer information cell.

As described above, the layered two-dimensional code unconnected to the Net of the present invention is formed by layering a plurality of two-dimensional codes (code layers) one upon another and includes the information of the predetermined color of each code layer as the index information code. Therefore as shown in FIG. 1, data can be decoded independently by using a read application (software) that operates on a read means 3 of a portable telephone and the like.

Figure 4:
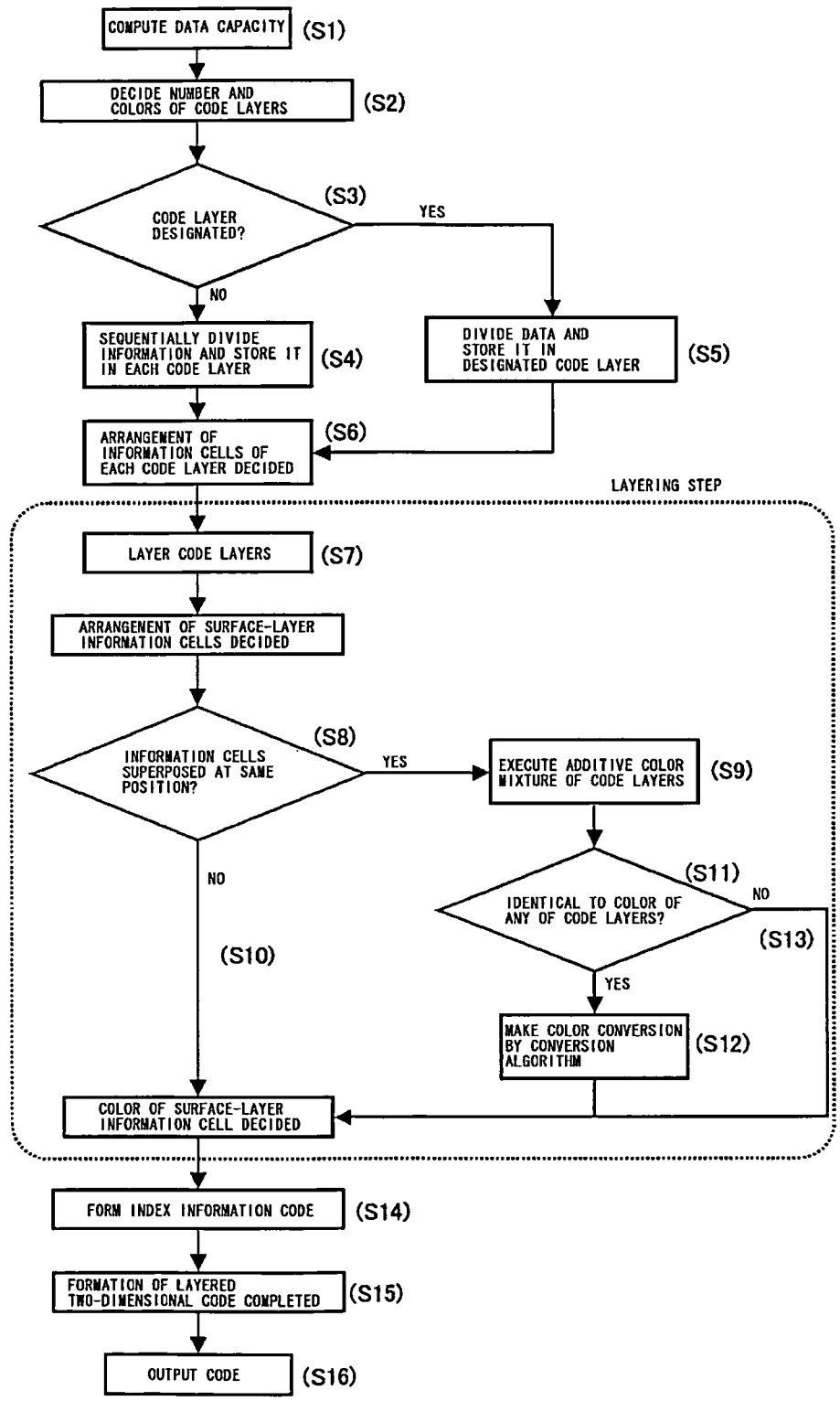
FIG. 4 is a flowchart of a method of creating the layered two-dimensional code unconnected to the Net.

The method of creating the layered two-dimensional code unconnected to the Net of the present invention is described below with reference to FIG. 4. FIG. 4 is a flowchart of a method of creating the layered two-dimensional code unconnected to the Net.

A data capacity necessary for storing information to be coded is computed (S1). In consideration of the data capacity, the number of code layers and the color (RGB value) of each code layer are decided (S2). The color of each code layer can be arbitrarily decided. To decrease a burden in the processing of the color conversion algorithm, it is preferable to select colors of the code layers in such a way that a color obtained by combining the colors of the code layers with one another has a low possibility of becoming the same as the color obtained by executing the additive color mixture of the colors of the code layers.

In distributing information to specific code layers, the specific code layers are designated (S3). If it is decided that the specific code layers are designated, data is stored in the designated code layers by dividing and coding the data (S5). If it is decided that no code layer is designated, the data is sequentially stored in each code layer by dividing and coding the data (S4). In distributing the information to each code layer, the data is not distributed to a position where the index information code which is described later is to be formed, but a space is secured at the position where the index information code is to be formed. By performing the above-described steps, the arrangement of the information cells of each code layer is decided (S6).

In coding the information, it is possible to adopt an existing arbitrary two-dimensionally coding method. Because of a high diffusion rate in Japan, it is preferable to adopt the QR code. Because in the present invention, as described above, the existing two-dimensionally coding methods can be utilized to code the information to each code layer. Thus the information can be coded simply without using a separate algorithm.

The obtained code layers are layered one upon another to form the surface layer (S7). The arrangement of the surface-layer information cells of the surface layer is decided by layering the code layers one upon another, as shown in FIG. 2. It is judged whether the information cells of the plurality of code layers are superposed one upon another at the same position thereof (S8). When it is decided that the information cells of the plurality of code layers are present and superposed one upon another at the same position thereof corresponding to the surface-layer information cell, the additive color mixture is executed for the code layers where the superposed information cells are present (S9). If it is decided that the information cell of only one of the code layers is present and there is no superposition of the information cells at the position thereof corresponding to the surface-layer information cell, the color of the surface-layer information cell is set to the same color as that of the single code layer (S10).

It is judged whether the color obtained by executing the additive color mixture executed at (S9) is the same as that of any of the plurality of code layers (S11). If it is decided that the two colors are identical to each other, the color obtained by executing the additive color mixture is converted into a color in accordance with the predetermined conversion algorithm (for example, method of executing interconversion between RGB value and HSB value shown in FIG. 3). The converted color is set to the color of the surface-layer information cell (S12). If it is decided that the two colors are not identical to each other, the color obtained by executing the additive color mixture is set to the color of the surface-layer information cell (S13). The above-described steps (S7) through (S13) are code layer-layering steps in the layered two-dimensional code unconnected to the Net.

At a part of the surface layer, the index information code essentially including the information of the color of each code layer decided at (S2) is formed (S14). In addition to the information of the color of each code layer, the index information code is capable of including index information indicating a conversion algorithm pattern. As necessary, at a part of the surface layer, as shown in FIG. 1, a predetermined reference color cell is formed.

By performing the above-described steps, the arrangement, the colors, and the other portions of the surface-layer information cells are decided, and the surface layer is completed as the layered two-dimensional code (S15). The layered two-dimensional code is outputted by printing it on a printing medium or by displaying it on an image display apparatus (S16). When the layered two-dimensional code is displayed on the image display apparatus, it can be displayed in the form of the RGB value. When the layered two-dimensional code is printed on the printing medium or other articles, printing is carried out after the RGB value is converted into a CMYK value.

In the method of creating the layered two-dimensional code unconnected to the Net, operations and judgements are executed at the above-described steps by using a code-creating software and the like which operates on an OS (operating system) mounted on a PC (personal computer) or a portable terminal. The layered two-dimensional code is displayed by using the image display apparatus, and printed by using a printing machine. The code creator may designate the code layer and the color thereof by using an input means for the PC.

Figure 5:
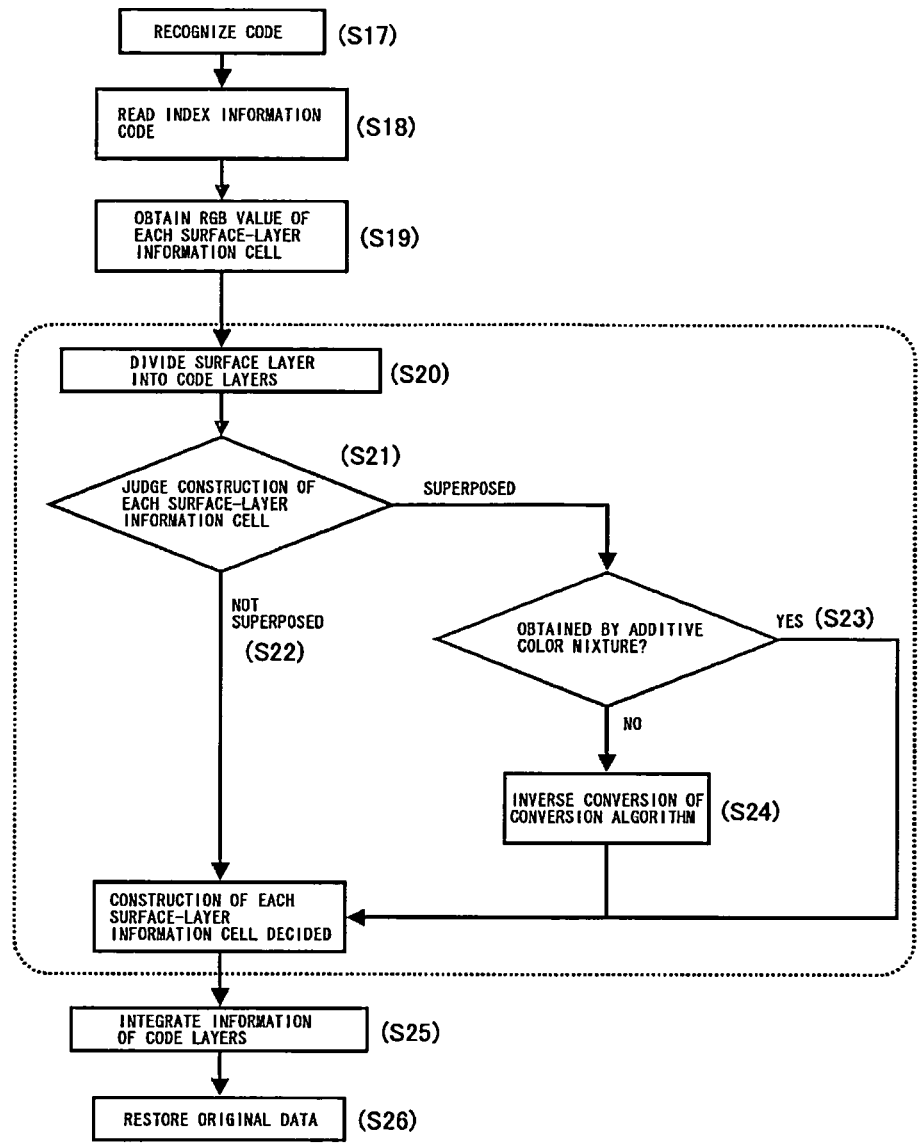
FIG. 5 is a flowchart of a method of reading the layered two-dimensional code unconnected to the Net.

A method of reading the layered two-dimensional code unconnected to the Net of the present invention is described below with reference to FIG. 5. FIG. 5 is a flowchart of the method of reading the layered two-dimensional code unconnected to the Net.

By using a read means essentially having a code-recognizing apparatus capable of recognizing a color gradation constructing the layered two-dimensional code, the code of the surface layer is recognized (S17). Recognizing the code means that the arrangement of the surface-layer information cells of the layered two-dimensional code and the color of each surface-layer information cell are recognized as numerical values. When the layered two-dimensional code is displayed on the image display apparatus, the layered two-dimensional code is recognized as digital data by using a software and the like for reading use. In this case, the layered two-dimensional code can be very correctly recognized. In printing the layered two-dimensional code, after the layered two-dimensional code is obtained as image data by using the code-recognizing apparatus such as a CCD camera, AD (analog to digital) conversion is executed by using the software and the like for reading use to recognize the layered two-dimensional code.

As the code-recognizing apparatus for reading the layered two-dimensional code, a scanner for code-reading use, a camera-equipped portable telephone applicable to read of the two-dimensional code, and the like are listed. Because the layered two-dimensional code unconnected to the Net of the present invention is intended to have eight color layers and 256 colors in the number of colors of the surface layer, the number of pixels of the code-recognizing apparatus such as the scanner, the CCD camera, and the like is set to preferably not less than 2,000,000.

When the predetermined reference color cell is formed on the surface layer, at a code-recognizing time, the reference color cell is initially recognized, and the colors of the other surface-layer information cells are obtained after an image compensation is executed by computing color differences from the reference color.

After the code of the surface layer is recognized, the index information code in the code of the surface layer is read to obtain the RGB value indicating the color of each code layer of the layered two-dimensional code (S18). The RGB value indicating the color of each surface-layer information cell is obtained (S19). The RGB value of each surface-layer information cell obtained at the step (S19) may be obtained at the above-described step (S17).

By performing the above-described steps, the RGB value indicating the color of each code layer constructing the layered two-dimensional code and the RGB value indicating the arrangement of the surface-layer information cells and the color of each surface-layer information cell are obtained.

The surface layer is divided into code layers (S20). Dividing steps are described below.

Based on the color of each surface-layer information cell, it is judged whether (1) the surface-layer information cell consists of the information cell of only one of the code layers, (2) the plurality of information cells are superposed one upon another, and the additive color mixture of the colors of the information cells is executed to obtain the color of the surface-layer information cell or (3) the plurality of information cells are superposed one upon another, and the color obtained by executing the additive color mixture of the colors of the information cells is converted in accordance with the predetermined conversion algorithm to obtain the color of the surface-layer information cell (S21).

When the RGB value indicating the color of the surface-layer information cell indicates the same color as that of any of the plurality of code layers, it can be judged that the information cells are not superposed and are present in only the code layers having the same color at the position thereof corresponding to the surface-layer information cell (S22, the above-described (1)).

When the RGB value indicating the color of the surface-layer information cell does not indicate the same color as that of any of the plurality of code layers but indicates the color obtained by executing the additive color mixture of colors of some of the plurality of code layers, it can be judged that the information cells are present in some code layers at the position thereof corresponding to the surface-layer information cell (S23, above-described (2)). By executing the additive color mixture based on the information of the RGB values indicating the color of each code layer, it is identified which code layers make up the RGB value indicating the color of the surface-layer information cell. Because the color of each code layer is fixed, the number of colors obtained by the additive color mixture of the colors of the code layers is limited to certain numbers.

When the RGB value indicating the color of the surface-layer information cell does not indicate the same color as that of any of the plurality of code layers nor indicates the color obtained by executing the additive color mixture of the colors of some of the plurality of code layers, it is decided that the color of the surface-layer information cell is obtained by making a color conversion in accordance with the predetermined conversion algorithm.

In this case, in accordance with the predetermined conversion algorithm, a plurality of code layers having the RGB value indicating the color of the surface-layer information cell is decided by a reverse conversion of the conversion algorithm, based on the information of the RGB value indicating the color of each code layer. It can be judged that the information cells are present in the decided code layers at the position thereof corresponding to the surface-layer information cell (S24, above-described (3)).

Based on the arrangement of the surface-layer information cells of the surface layer and the colors of the surface-layer information cells thereof obtained by performing the above-described steps, the arrangement of the information cells of each code layer is decided, and the code layers are divided.

Information obtained from the arrangement of the information cells of each code layer obtained at the dividing steps is integrated (S25). Coded original information is restored (S26). To decode each code layer, it is possible to adopt a decoding method corresponding to the method of coding the layered two-dimensional code.

The operation and judgement at each step of the above-described read method are executed by using a software, for code-reading use, which operates on an OS mounted on a PC or a portable terminal.

Figure 6:
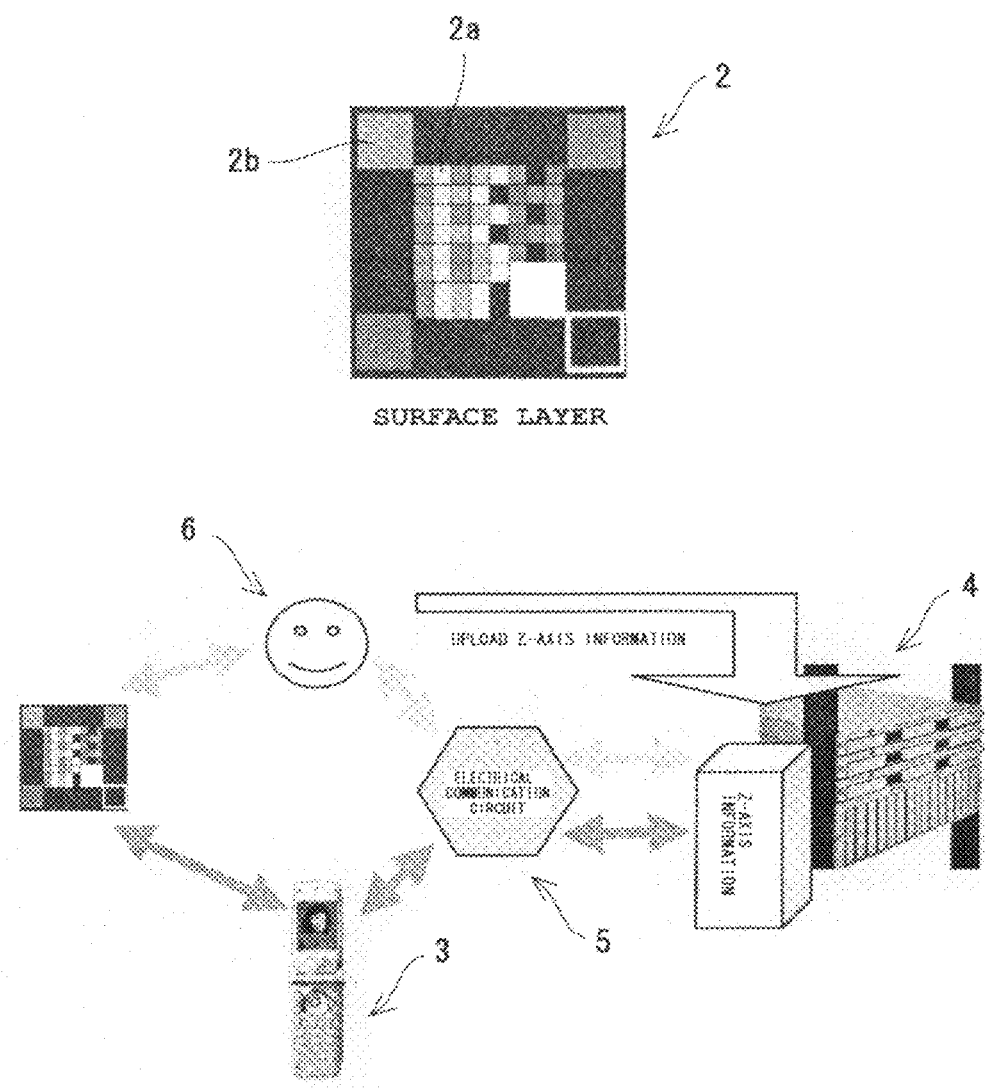
FIG. 6 is an outline view of a layered two-dimensional code connected to the Net.
Figure 7:
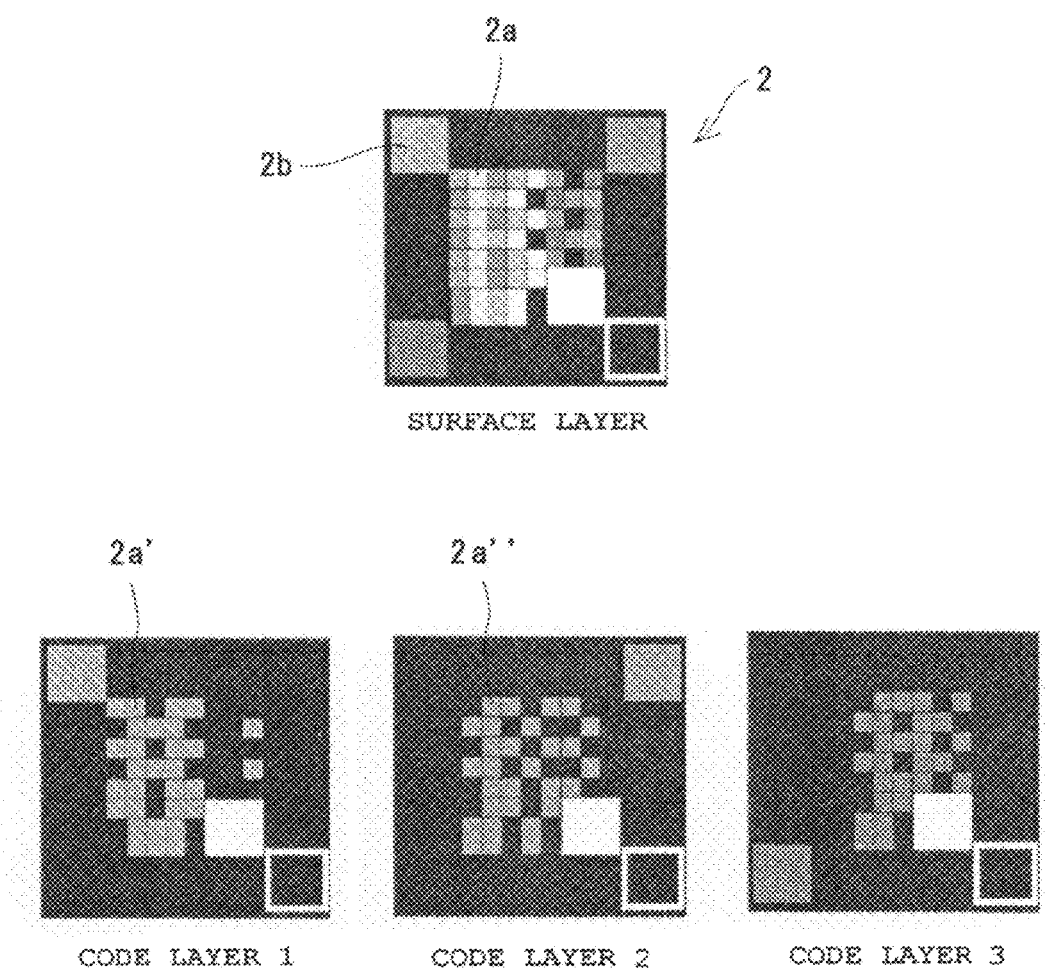
FIG. 7 shows the relationship between a surface layer and code layers of the layered two-dimensional code connected to the Net.

The outline of a layered two-dimensional code connected to the Net of the present invention is described below with reference to FIGS. 6 and 7. FIG. 6 is an outline view of the layered two-dimensional code connected to the Net. FIG. 7 shows the relationship between a surface layer and code layers of the layered two-dimensional code connected to the Net.

A layered two-dimensional code 2 connected to the Net of the present invention is formed as a surface layer by layering a plurality of code layers (in FIG. 7, code layers 1, 2, and 3) each having information cells 2a' (2a") arranged in a two-dimensional matrix and by integrating the plurality of code layers.

Each of the plurality of code layers is constructed of information cells each having a color specified for each code layer. For example, the code layers 1, 2, and 3 are constructed of information cells of (RGB=0, 255, 0), (RGB=255, 0, 0), and (RGB=0, 0, 255) respectively.

The surface layer is composed of surface-layer information cells 2a arranged by layering the code layers one upon another (see FIG. 7). As shown in FIG. 6, in the layered two-dimensional code connected to the Net, it is necessary for a read means 3 to obtain the information of a predetermined color of each of the code layers and the information of each of the code layers (Z-axis information) constructing the surface-layer information cell from a predetermined server 4 connected through an electrical communication circuit 5 such as an IP connection network. Thus information for connecting to the server 4 is included in the surface layer. It is possible to store the information for connecting to the server 4 in a software for reading use without forming the information for connecting to the server 4 in the surface layer. The Z-axis information is automatically registered in the server 4 through the electrical communication circuit 5, when the creator 6 creates codes.

As shown in FIG. 7, when the information cells (2a' and 2a") of the code layers 1 and 2 are superposed one upon the other at a position thereof corresponding to the surface-layer information cell 2a, the color of the surface-layer information cell 2a is obtained by executing the additive color mixture of the colors of code layers 1 and 2. That is, because the code layer 1 is green (RGB=0, 255, 0) and the code layer 2 is red (RGB=255, 0, 0), the color of the surface-layer information cell 2a is yellow (RGB=255, 255, 0). When the information cell of only one of the code layers is present at the position thereof corresponding to the surface-layer information cell 1a, there is no superposition of the information cells. Thus the surface-layer information cell 1a has the same color as that of the single code layer.

In the layered two-dimensional code connected to the Net, when the surface-layer information cell of the surface layer has the same color as that of any of the code layers, it is possible to obtain the information of the code layer constructing the surface-layer information cell from a predetermined server through the IP connection network. Therefore unlike the layered two-dimensional code unconnected to the Net, the layered two-dimensional code connected to the Net eliminates the need for the use of the conversion algorithm and the like.

Figure 8:
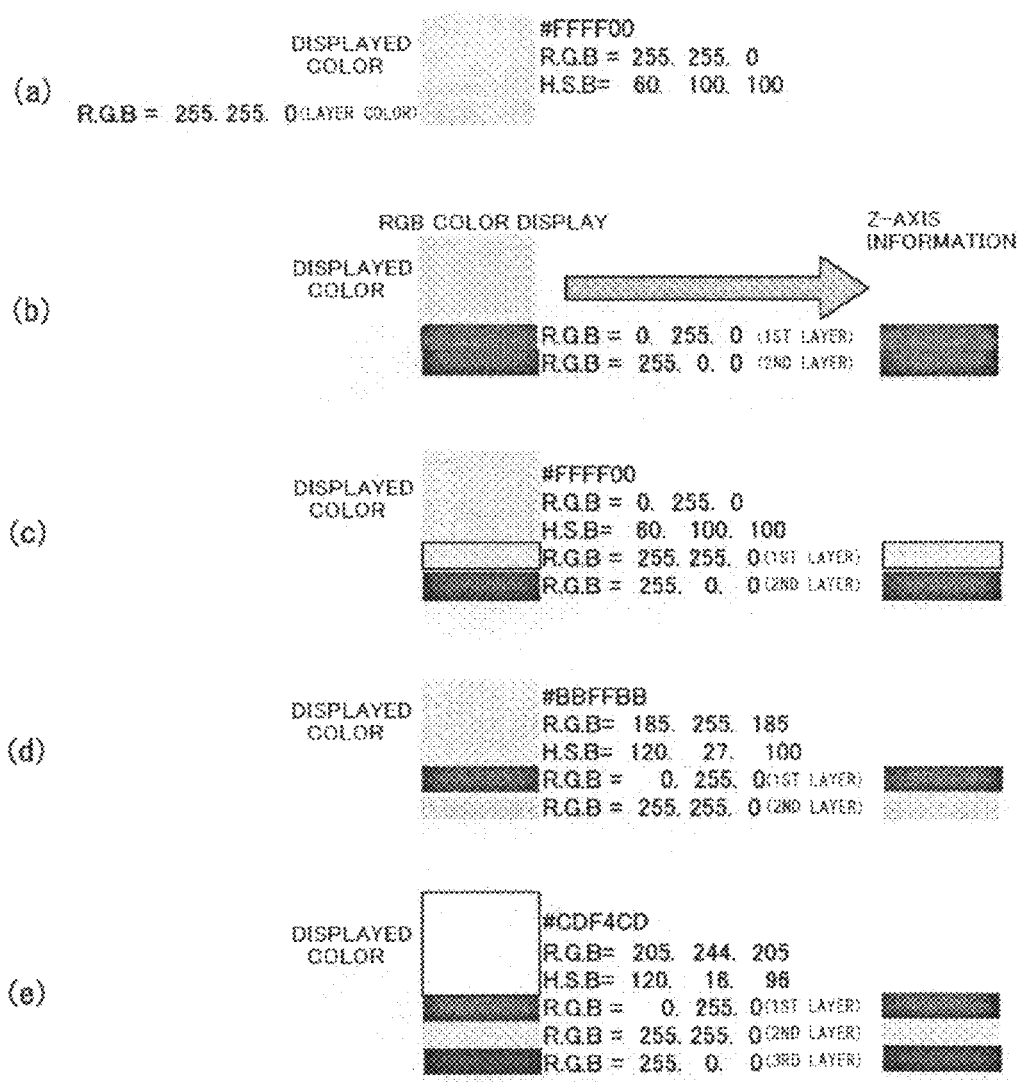
FIG. 8 shows a color conversion method of a surface-layer information cell to be carried out by using an additive color mixture.

With reference to FIG. 8, a method of deciding the color of the surface-layer information cell by executing the additive color mixture is described below. In FIG. 8, a displayed color, a layer, and Z-axis information mean the color of the surface-layer information cell, the code layer, and the information of the color of each code layer respectively. Similarly to the layered two-dimensional code unconnected to the Net, in all of FIGS. 8(a) through 8(e), the color obtained by executing the additive color mixture is expressed in only yellow. But paying attention to the code layer, in FIG. 8(a), only the code layer of yellow (RGB=255, 255, 0) is present, whereas in FIG. 8(b), the code layer of green and that of red (additive color mixture: RGB=255, 255, 0) are layered on each other; in FIG. 8(c), the code layer of yellow and that of red (additive color mixture: RGB=510, 255, 0) are layered on each other; in FIG. 8(d), the code layer of green and that of yellow (additive color mixture: RGB=255, 510, 0) are layered on each other; and in FIG. 8(e), the code layer of green, that of yellow, and that of red (additive color mixture: RGB=510, 510, 0) are layered one upon another.

As described above, when the surface-layer information cell has the same color as that of any of the code layers, the layered two-dimensional code is connected to the server through the IP connection network to obtain the information indicating which of the code layers constructing the surface-layer information cell has the same color as that of the surface-layer information cell.

Figure 9:
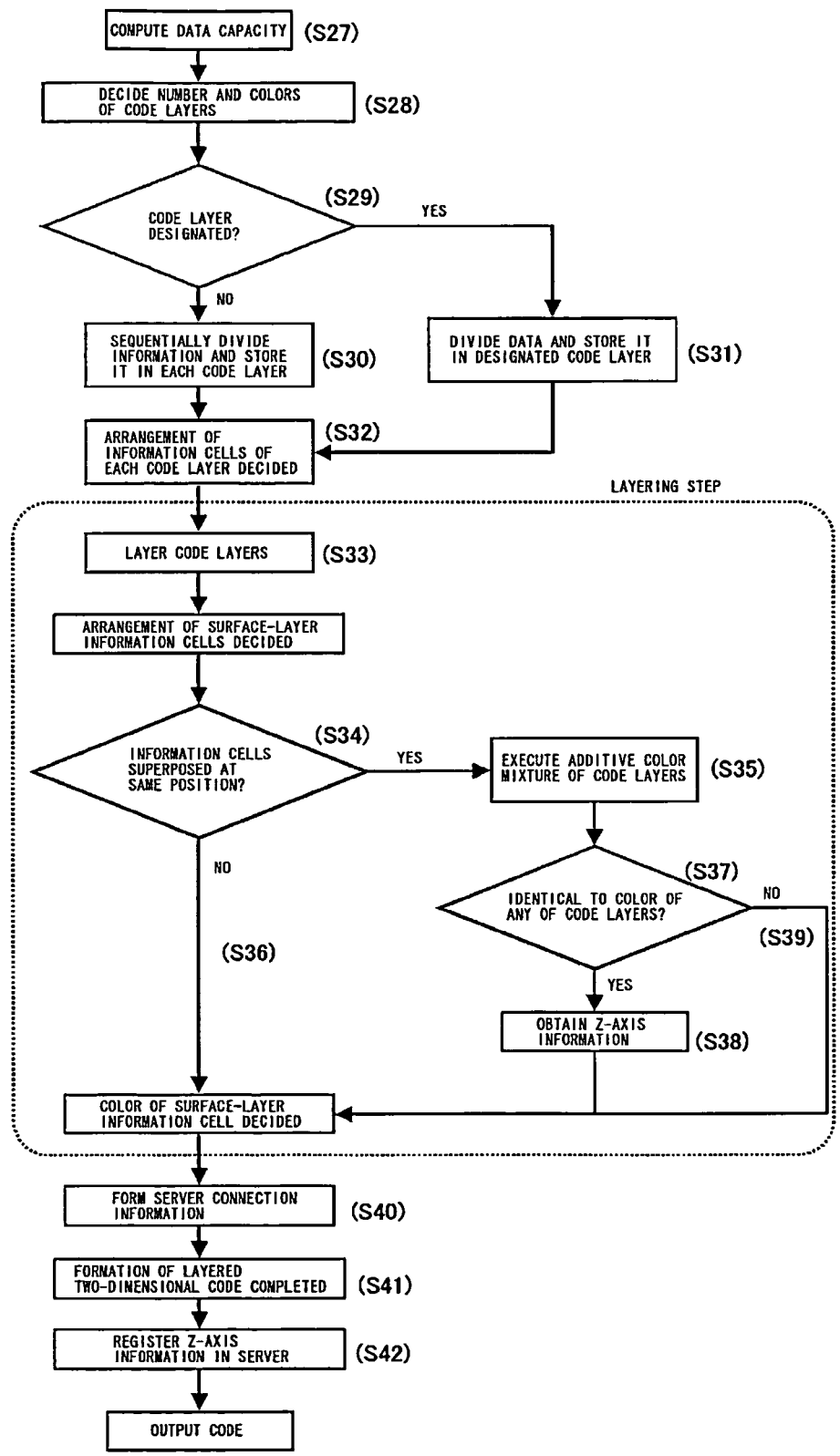
FIG. 9 is a flowchart of a method of creating the layered two-dimensional code connected to the Net.

The method of creating the layered two-dimensional code connected to the Net of the present invention is described below with reference to FIG. 9. FIG. 9 is a flow chart of a method of creating the layered two-dimensional code connected to the Net.

A data capacity necessary for storing information to be coded is computed (S27). In consideration of the data capacity, the number of the code layers and the color of each of the code layers (RGB value) are decided (S28). The color of each code layer can be arbitrarily decided.

In distributing information to specific code layers, the specific code layers are designated (S29). If it is decided that the specific code layers are designated, data is stored in the designated code layers by dividing and coding the data (S31). If it is decided that no code layer is designated, the data is sequentially stored in each code layer by dividing and coding the data (S30). By performing the above-described steps, the arrangement of the information cells of each code layer is decided (S32). In coding information, similarly to the layered two-dimensional code unconnected to the Net, it is possible to adopt an arbitrary existing two-dimensionally coding method.

The obtained code layers are layered one upon another to form the surface layer (S33). The arrangement of the surface-layer information cells of the surface layer is decided by layering the code layers one upon another, as shown in FIG. 7. It is judged whether the information cells of the plurality of code layers are superposed one upon another at the same position thereof (S34). When it is decided that the information cells of the plurality of code layers are present and superposed one upon another at the same position thereof corresponding to the surface-layer information cell, the additive color mixture is executed for the code layers where the superposed information cells are present (S35). If it is decided that the information cell of only one of the code layers is present and is not superposed at the position thereof corresponding to the surface-layer information cell, the color of the surface-layer information cell is set to the same color as that of the single code layer (S36).

It is judged whether the color obtained by executing the additive color mixture at the step (S35) is the same as that of any of the plurality of code layers (S37). If it is decided that the two colors are identical to each other, the information (Z-axis information) of the code layers constructing the surface-layer information cell, namely, the RGB value indicating the color of the code layers constructing the surface-layer information cell is obtained (S38). If the two colors are not identical to each other, the color obtained by executing the additive color mixture is set to the color of the surface-layer information cell (S39). The above-described steps (S33) through (S39) are code layer-layering steps in the layered two-dimensional code connected to the Net.

As necessary, at a part of the surface layer, there is formed a code for server connection information by which the read means obtains the information of the predetermined color of each of the code layers and the information of each of the code layers constructing the surface-layer information cell from the predetermined server connected to the layered two-dimensional code through the electrical communication circuit such as the IP connection network (S40). As necessary, at a part of the surface layer, as shown in FIG. 6, a predetermined reference color cell is formed. By performing the above-described steps, the arrangement, the colors, and the other portions of the surface-layer information cells are decided, and the surface layer is completed as the layered two-dimensional code (S41). The information of the code layers (Z-axis information) constructing the surface-layer information cell obtained at the step (S38) is connected to a predetermined server through the IP connection network and registered in the server (S42). In the present invention, "Information is registered in the server" means that information is stored in a data storage apparatus inside the server.

The layered two-dimensional code is outputted by printing it on a printing medium or by displaying it on an image display apparatus. When the layered two-dimensional code is displayed on the image display apparatus, it can be displayed in the form of the RGB value. When the layered two-dimensional code is printed on the printing medium or other articles, printing is carried out after the RGB value is converted into the CMYK value.

In the method of creating the layered two-dimensional code, operations (registration in the server is included) and judgements at the above-described steps are executed by using a code-creating software which operates on an OS mounted on a PC (personal computer) or a portable terminal. The layered two-dimensional code is displayed by using the image display apparatus and printed by using a printing machine. The code creator may designate the code layer and the color thereof by using an input means for the PC and the like.

Figure 10:
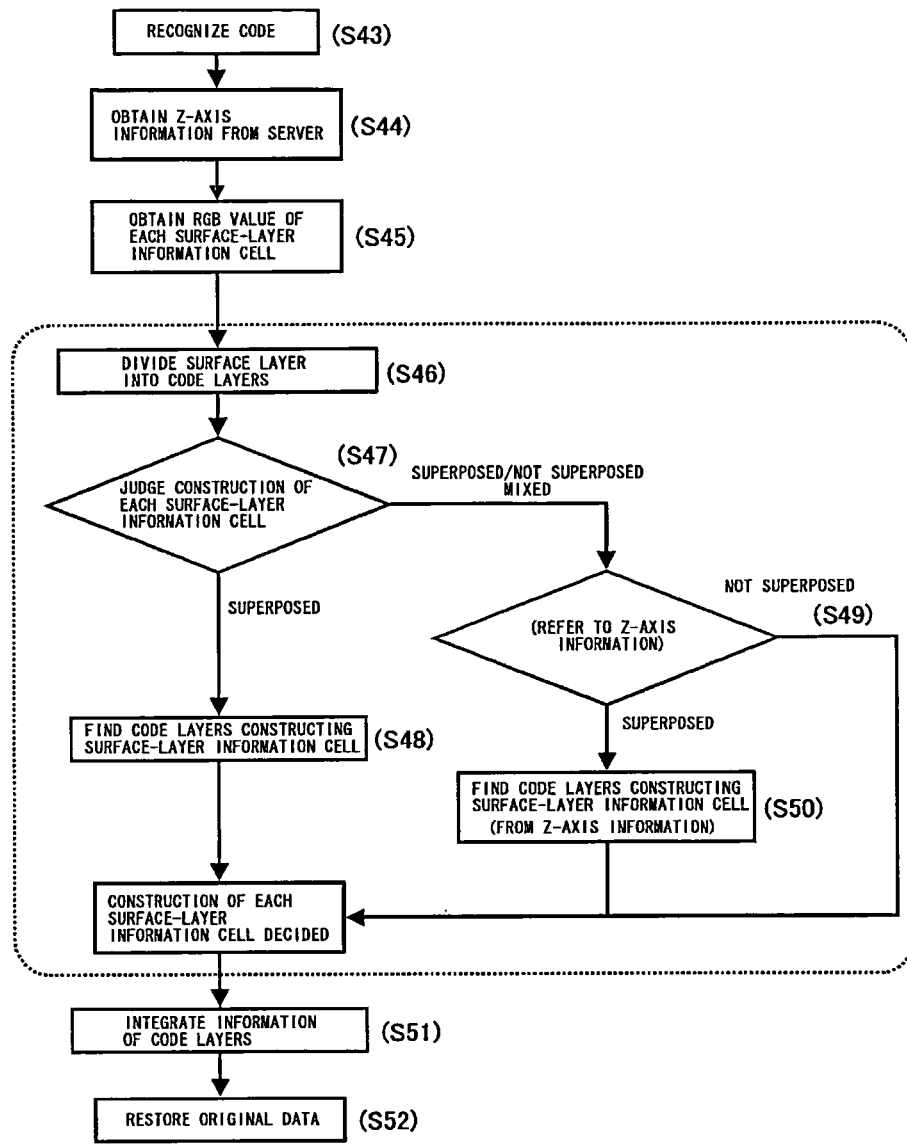
FIG. 10 is a flowchart of a method of reading the layered two-dimensional code connected to the Net.

A method of reading the layered two-dimensional code connected to the Net of the present invention is described below with reference to FIG. 10. FIG. 10 is a flowchart of the method of reading the layered two-dimensional code connected to the Net.

By using a read means essentially having a code-recognizing apparatus capable of recognizing a color gradation constructing the layered two-dimensional code, the code of the surface layer is recognized (S43). The code is recognized in a manner similar to that of the layered two-dimensional code unconnected to the Net. When the predetermined reference color cell is formed on the surface layer, at a code-recognizing time, the reference color cell is initially recognized, and the colors of other surface-layer information cells are obtained after an image compensation is executed by computing color differences from the reference color.

In the layered two-dimensional code connected to the Net of the present invention, it is possible to deal with code layers up to tens of thousands and provide a full color in the number of colors of the surface layer. Therefore it is preferable that the code-recognizing apparatus such as a scanner, a CCD camera, and the like are capable of reading the color gradation of the full color. The layered two-dimensional code connected to the Net is mainly intended to be displayed on the image display apparatus.

When the code of the surface layer has been formed, Z-axis information has been registered in the server connected through the electrical communication circuit such as the Internet. After the code of the surface layer is recognized as described above, the information of the code layers constructing the surface-layer information cell (Z-axis information) is obtained regarding all or necessary surface-layer information cells by connecting to the above-described server (S44). The RGB value indicating the color of each surface-layer information cell is obtained (S45). The RGB value indicating the color of each surface-layer information cell obtained at the step (S45) may be obtained at the above-described step (S43).

By performing the above-described steps, the Z-axis information of each surface-layer information cell constructing the layered two-dimensional code, the arrangement of the surface-layer information cells, and the RGB value indicating the color of the surface-layer information cells are obtained.

The surface layer is divided into code layers (S46). Dividing steps are described below.

Based on the color of the surface-layer information cell, it is judged whether (1) a plurality of information cells are superposed one upon another, and the color of the surface-layer information cell is obtained by executing the additive color mixture of the colors of the information cells or (2) the surface-layer information cell consists of one of the code layers or the plurality of code layers (S47).

When the RGB value indicating the color of the surface-layer information cell does not indicate the same color as that of any of the plurality of code layers, it is decided that information cells of the plurality of code layers are superposed one upon another (above-described (1)). In this case, by executing the additive color mixture based on the information of the RGB values indicating the color of each code layer, it is identified which code layers make up the RGB value indicating the color of the surface-layer information cell. (S48).

When the RGB value indicating the color of the surface-layer information cell indicates the same color as that of any of the plurality of code layers, it is judged that the information cells are not superposed but only the code layer having the same color as that of the surface-layer information cell is present at the position thereof corresponding to the surface-layer information cell or it can be judged that the information cells of a plurality of code layers are present at the position thereof corresponding to the surface-layer information cell (above-described (2)). Therefore in this case, with reference to the information (Z-axis information) of each of the code layers constructing the surface-layer information cell, the code layers are decided (S49, S50).

Based on the arrangement of the surface-layer information cell of the surface layer and the colors of the surface-layer information cells thereof obtained by performing the above-described steps, the arrangement of the information cells of each code layer is decided, and the code layers are divided.

Information obtained from the arrangement of the information cells of each code layer obtained by performing the above-described dividing steps is integrated (S51). Coded original information is restored (S52). To decode each code layer, it is possible to adopt a decoding method corresponding to the method of coding the layered two-dimensional code.

The operation and judgement at each step of the above-described read method are executed by using a software, for code-reading use, which operates on an OS mounted on a PC or a portable terminal.

The layered two-dimensional code connected to the Net and the layered two-dimensional code unconnected to the Net of the present invention can be attached to paper medium and all printing media; all electric images which can be displayed on the image display apparatus; and all media such as metal, glass, ceramic, plastic, and the like which can be processed to display them.

INDUSTRIAL APPLICABILITY

The layered two-dimensional code of the present invention has a considerably improved data capacity without increasing the area thereof in comparison to the conventional two-dimensional code. Therefore the layered two-dimensional code can be utilized in a wide range of industrial fields as a large-capacity two-dimensional code (paper memory (PM)) capable of including information such as long sentences and images.

The invention claimed is:

1. A layered two-dimensional code comprising a surface layer formed by layering a plurality of code layers each having information cells arranged in a two-dimensional matrix and by integrating said plurality of code layers, wherein each of said plurality of code layers is constructed of said information cells each having a color predetermined for each of said code layers; said surface layer comprises surface-layer information cells obtained by layering said code layers one upon another; and an index information code essentially including information of said predetermined color of each of said code layers is included at one part of said surface layer; when said information cells of said plurality of code layers are present and superposed one upon another at a position thereof corresponding to said surface-layer information cell, a color of said surface-layer information cell is obtained by executing an additive color mixture of colors of said code layers where said superposed information cells are present; when said information cell of only one of said code layers is present at said position thereof corresponding to said surface-layer information cell, said surface-layer information cell has the same color as that of said single code layer; and when said color obtained by executing said additive color mixture is the same as that of any of said plurality of code layers, said color obtained by executing said additive color mixture is converted into a color in accordance with a predetermined conversion algorithm so as to obtain said color of said surface-layer information cells, wherein said predetermined conversion algorithm is an algorithm capable of reversely converting the converted color into said color obtained by executing said additive color mixture includes using said index information code to determine the surface color layers from the predetermined color of each of the code layers.

2. The layered two-dimensional code according to claim 1, wherein in said predetermined conversion algorithm, after an RGB value indicating a color obtained by said additive color mixture is converted into an HSB value by a predetermined conversion algorithm, said HSB value is further converted into an RGB value by a predetermined conversion algorithm.

3. A method of creating the layered two-dimensional code according to claim 1 or 2, comprising the steps of: deciding the number of said code layers and a color of each of said code layers; deciding an arrangement of said information cells of each of said code layers by distributing information to be coded to each of said code layers; layering said code layers one upon another in a predetermined order to form said surface layer; and forming said index information code essentially including color information of each of said code layers at a part of said surface layer, wherein in said layering step, said code layers are layered one upon another to decide an arrangement of said surface-layer information cells constructing said surface layer; when said information cells of said plurality of code layers are present and superposed one upon another at a position thereof corresponding to said surface-layer information cell, a color of said surface-layer information cells is obtained by executing said additive color mixture of colors of said code layers where said superposed information cells are present; when said information cell of only one of said code layers is present at said position thereof corresponding to said surface-layer information cell, said surface-layer information cell has the same color as that of said single code layer; and when said color obtained by executing said additive color mixture is the same as that of any of said plurality of code layers, said color obtained by executing said additive color mixture is converted into a color in accordance with said predetermined conversion algorithm so as to obtain said color of said surface-layer information cells.

4. A method of reading the layered two-dimensional code according to claim 1 or 2, comprising the steps of: recognizing a code of said surface layer by using a read means having essentially a code-recognizing apparatus capable of recognizing a color gradation constructing said layered two-dimensional code; obtaining said RGB value indicating a color of each of said code layers by reading said index information code; obtaining said RGB value indicating a color of each of said surface-layer information cells; dividing said surface layer into said code layers; and restoring coded original information by integrating information obtained from said arranged information cells of each of said code layers obtained by said dividing operation, wherein in said dividing step, when said RGB value indicating said color of each of said surface-layer information cells indicates the same color as that of any of said plurality of code layers, it is judged that said information cells of only said code layers are present at a position thereof corresponding to said surface-layer information cells; when said RGB value indicating said color of said surface-layer information cells does not indicate the same color as that of any of said plurality of code layers, by executing said additive color mixture, a plurality of code layers having said RGB value indicating said color of said surface-layer information cells is found, and it is judged that said information cells of said plurality of code layers are present at said position thereof corresponding to said surface-layer information cells; and when said RGB value indicating said color of said surface-layer information cells indicates a color obtained by conversion executed in accordance with said predetermined conversion algorithm, a plurality of code layers having said RGB value indicating said color of said surface-layer information cells is found by a reverse conversion of said conversion algorithm, and by judging that said information cells of said plurality of code layers are present at said position thereof corresponding to said surface-layer information cells, said surface layer is divided into said code layers.

5. A layered two-dimensional code comprising a surface layer formed by layering a plurality of code layers each having information cells arranged in a two-dimensional matrix and by integrating said plurality of code layers, wherein each of said plurality of code layers is constructed of said information cells each having a color predetermined for each of said code layers; said surface layer comprises surface-layer information cells obtained by layering said code layers one upon another; and at a part of said surface layer or inside a read means of said layered two-dimensional code, a code for server connection information by which said read means obtains information of a predetermined color of each of said code layers and information of each of said code layers constructing said surface-layer information cells from a predetermined server through an electrical communication circuit is included; and when said information cells of said plurality of code layers are present and superposed one upon another at a position thereof corresponding to said surface-layer information cell, a color of said surface-layer information cell is obtained by executing an additive color mixture of colors of said code layers where said superposed information cells are present; and when said information cell of only one of said code layers is present at said position corresponding to said surface-layer information cell, said surface-layer information cell has the same color as that of said single code layer, and when said color obtained by executing said additive color mixture is the same as that of any of said plurality of code layers, said color obtained by executing said additive color mixture is converted into a color in accordance with a predetermined conversion algorithm so as to obtain said color of said surface-layer information cells, wherein said color of code for server connection information by which said read means obtains information of a predetermined color of each of said code layers and information of each of said code layers constructing said surface-layer information cells including colors obtained by said predetermined conversion algorithm from a predetermined server.

6. A method of creating the layered two-dimensional code according to claim 5, comprising the steps of: deciding the number of said code layers and a color of each of said code layers; deciding an arrangement of said information cells of each of said code layers by distributing information to be coded to each of said code layers; layering said code layers one upon another in a predetermined order to form said surface layer; and registering the number of said code layers, said color of each of said code layers, and information of said code layers constructing said surface-layer information cells in said predetermined server connected through said electrical communication circuit, wherein in said layering step, said code layers are layered one upon another to decide an arrangement of said surface-layer information cells constructing said surface layer; when said information cells of said plurality of code layers are present and superposed one upon another at said position thereof corresponding to said surface-layer information cell, a color of said surface-layer information cells is obtained by executing said additive color mixture of colors of said code layers where said superposed information cell is present; and when said information cell of only one of said code layers is present at said position thereof corresponding to said surface-layer information cell, said surface-layer information cell has the same color as that of said single code layer.

7. A method of reading the layered two-dimensional code according to claim 5, comprising the steps of: recognizing a code of said surface layer by using said read means having essentially a code-recognizing apparatus capable of recognizing a color gradation constructing said layered two-dimensional code; obtaining the number of said code layers, an RGB value indicating a color of each of said code layers, and said information of each of said code layers constructing said surface-layer information cells by accessing said server connected through said electrical communication circuit; obtaining said RGB value indicating a color of each of said surface-layer information cells; dividing said surface layer into said code layers; and restoring coded original information by integrating information obtained from said arranged information cells of each of said code layers obtained by said dividing operation, wherein in said dividing step, when said RGB value indicating said color of each of said surface-layer information cells indicates the same color as that of any of said plurality of code layers, based on information of said code layers constructing said surface-layer information cells obtained from said predetermined server, a plurality of code layers where said information cells are present at a position thereof corresponding to said surface-layer information cell are found; and when said RGB value indicating said color of each of said surface-layer information cells does not indicate the same color as that of any of said plurality of code layers, by executing an additive color mixture, a plurality of code layers having said RGB value indicating said color of each of said surface-layer information cells is found, and by judging that said information cells of said plurality of code layers is present at said position thereof corresponding to said surface-layer information cells, said surface layer is divided into said code layers.

8. The layered two-dimensional code according to claim 1, 2 or 5, wherein at a part of said surface layer, a predetermined reference color cell is included.

* * * * *